United States Patent [19]
Kaub

[11] Patent Number: 4,630,870
[45] Date of Patent: Dec. 23, 1986

[54] PRESSURE REGULATOR FOR HYDRAULIC VEHICLE BRAKING SYSTEMS

[75] Inventor: Manfred Kaub, Rhens, Fed. Rep. of Germany

[73] Assignee: Lucas Industries public limited company, Birmingham, England

[21] Appl. No.: 739,686

[22] Filed: May 31, 1985

[30] Foreign Application Priority Data

Jun. 19, 1984 [DE] Fed. Rep. of Germany ... 8418527[U]

[51] Int. Cl.⁴ .......... B60T 8/14

[52] U.S. Cl. .......... 303/24 A; 303/24 F; 188/349

[58] Field of Search .......... 303/24 A, 24 C, 24 F, 303/24 R, 6 C, 84 R; 188/349; 137/38

[56] References Cited

U.S. PATENT DOCUMENTS 3,252,740 5/1966 Stelzer .......... 303/6 C
4,080,006 3/1978 Nogami et al. .......... 303/24 F
4,125,291 11/1978 Nogami .......... 303/24 A
4,390,213 6/1983 Berisch .......... 303/24 A

*Primary Examiner*—Duane A. Reger
*Assistant Examiner*—James E. Barlow
*Attorney, Agent, or Firm*—Scrivener Clarke Scrivener and Johnson

[57] ABSTRACT

A casing (10) has an inlet (20) and a valve chamber (40) connected to the same as well as an outlet (60). In the valve chamber (40) a valve seat (54) is arranged at the entrance of a passage (52) leading to the outlet (60) and furthermore a valve member (42) is arranged for brake fluid to flow around it. The valve member is movable in response to deceleration from an inoperative position against the valve seat (54). A barrier member (26) is arranged between the inlet (20) and the valve member (42) for flow of brake fluid around or through the same. The barrier member is movable from an inoperative position remote from the valve member (42) until it hits the valve member (42), at least approximately in the direction of movement thereof.

3 Claims, 1 Drawing Figure

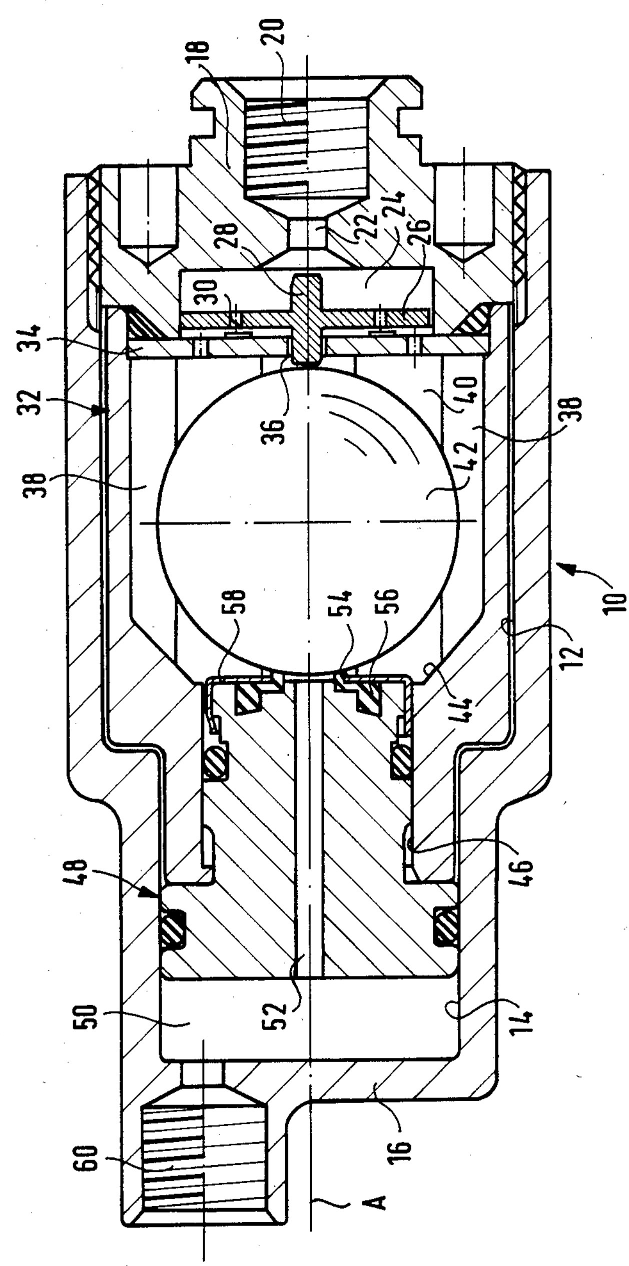
20
18
28
22
24
26
30
34
32
36
40
38
42
38
10
58
54
56
12
44
46
48
50
52
14
60
16
A

PRESSURE REGULATOR FOR HYDRAULIC VEHICLE BRAKING SYSTEMS

BACKGROUND OF THE INVENTION

1. Field of the Invention

The invention relates to a pressure regulator for hydraulic vehicle braking systems, comprising a casing which has an inlet and a valve chamber connected to the same as well as an outlet, a valve seat which is arranged in the valve chamber at the entrance of a passage leading to the outlet, and a valve member which is arranged in the valve chamber so that brake fluid can flow around it and which is movable in response to deceleration from an inoperative position to the valve seat.

2. Description of the Prior Art

A pressure regulator of this kind known from DE-C No. 1 780 644 has the valve chamber limited rearwardly toward the inlet by a partition which fixes the inoperative position of the valve member embodied by a sphere. The partition separates the valve chamber from an antechamber which communicates with the inlet through a constricted axial passage. A jet-like hole is formed in the middle of the partition and, upon vigorous brake actuation, brake fluid will flow like a jet through this hole against the valve member imparting to the latter an impulse to propel it against the valve seat. In this manner it is assured that the valve member quickly blocks the passage leading to the outlet if the brakes are actuated suddenly or especially strongly, thus preventing jamming of the rear wheel brakes which are connected to the outlet. Upon smooth and gradual brake actuation, on the other hand, the valve closing member will not reach the valve seat until the deceleration of the vehicle equipped with the pressure regulator has surpassed a certain value. A stepped bore is connected in parallel with the valve chamber and the passage leading from the same to the outlet. In this bore a stepped piston is so arranged that its smaller end surface is exposed to the pressure prevailing at the inlet and its greater end surface to the pressure at the outlet. Upon closing of the valve and further pressure rise at the inlet, therefore, the stepped piston causes a reduced pressure increase at the outlet.

Another pressure regulator of the kind specified initially is known from DE-C No. 2 213 463 with which the passage leading from the valve chamber to the outlet is formed in a stepped piston whose smaller end surface defines the valve chamber and carries the valve seat. Also with this known pressure regulator the valve member constituted by a sphere comes to lie against the valve seat at a certain deceleration of the vehicle, thus blocking the passage which leads to the outlet. As the pressure continues to rise at the inlet and in the valve chamber, the stepped piston is displaced forwards into a position into which the valve member cannot follow because an annular stop at the casing prevents its further forward movement. Therefore, more brake fluid flows through the passage in the stepped piston to the outlet where it causes a further increase in pressure which again moves the stepped piston to the rear so that the valve seat once more contacts the valve member. These reciprocating motions of the stepped piston are repeated as the pressure continues to rise. After the first closing of the valve, therefore, the pressure at the outlet increases less steeply than the pressure at the inlet, as with the known pressure regulator described first.

With this and further known pressure regulators of this kind there is a possibility, for instance, after an exchange of the brake fluid that an air bubble forms in the highest region of the valve chamber above and in front of the valve seat. It would be costly to provide a vent screw at this location and, besides, such a vent screw would be difficult to reach with the usual conditions of installation. Thus it would be desirable to vent a braking system comprising one or more pressure regulators of the kind specified at a different place, preferably located centrally and readily accessible. To achieve that, it is a condition that air bubbles be dispelled from the valve chamber toward the outlet, a place from which they will easily reach the central venting location if suitable conduits are provided. For safety reasons this must be done with the vehicle at standstill, i.e. without the cooperation of forces of deceleration.

With the pressure regulator known from DE-C No. 1 780 644 a liquid fet directed against the valve member can be produced upon violent brake actuation, and this jet is suitable to move the valve member forwardly into a position in which it constricts the space taken up by an air bubble. Yet the liquid jet is not sufficient to cause a flow between the valve member and the valve seat strong enough to entrain the air bubble. With the pressure regulator known from DE-C No. 2 213 463 strong brake actuation with the vent screw at a communicating rear wheel brake in open position, can convey a great amount of brake fluid per unit time into the valve chamber because the latter is connected directly to the inlet. However, with the vehicle stopped, the valve member cannot be moved forwards and, therefore, cannot define an annular space around the valve seat narrow enough to create a flow velocity at which air is entrained.

SUMMARY OF THE INVENTION

It is, therefore, an object of the invention to design a pressure regulator of the kind defined initially such that an air bubble which was left in its valve chamber can be eliminated in simple manner and, above all, without any external intervention on the pressure regulator itself.

This object is met, in accordance with the invention, in that a barrier member is arranged between the inlet and the valve member, around or through which barrier member brake fluid can flow and which is movable in response to the flow from an inoperative position remote from the valve member at least approximately in the direction of movement thereof until it hits against the valve member.

If the usual conditions are established for venting vehicle braking systems, such as by opening vent screws on the wheel brake cylinders and then the brake pedal is actuated suddenly, a large volume of brake fluid per unit time flows through the inlet and builds up at the barrier member according to the invention. Because of its inert mass, the barrier member at first will resist the flow but then will be accelerated so as to impact on the valve member which will thus be moved in forward direction toward the valve seat. The great amount of brake fluid entering the valve chamber upon forward displacement of the barrier member will meet with a greatly constricted annular space around the valve seat for further flow toward the outlet. Consequently it will attain a correspondingly high flow velocity in this annular space and thus air will be entrained toward the valve seat and through the same as well as the downstream passage toward the outlet. If the valve seat is made stationary, a plurality of pumping movements by the brake pedal may be required to let the air escape completely out of the valve chamber. If the valve seat, on the other hand, is provided on a stepped piston, the latter may become so adjusted that complete venting will be possible with but a single brake actuation.

The invention preferably is realized in a pressure regulator with which the inoperative position of the valve member is determined by a partition defining an antechamber between the inlet and the valve chamber and having a central aperture, as is the case according to DE-C No. 1 780 644 or, to name another example, according to DE-A No. 3 243 053. In this case the invention preferably is developed further in that the barrier member is placed in the antechamber and has a stem which is movable through the central aperture against the valve member.

As with the two known pressure regulators mentioned last, a constricted axial passage may be provided between the inlet and the antechamber. In this event an advantageous further development of the invention resides in that the stem extends also in the direction of the inlet, projecting like a plug into the passage when the barrier member is at rest. In this manner the barrier member may be given an extremely great acceleration almost like a projectile.

It is not necessarily desirable that the barrier member exert its influence in the sense of acdelerating the valve member also upon braking during operation or when the braking system is vented and otherwise intact. For this reason the pressure regulator according to the invention preferably is so designed that the travelling distance of the barrier member from its inoperative position until it hits the valve member is greater than the quotient of the design volume of the brake fluid entering through the inlet upon brake actuation and the cross sectional area of the barrier member. This design makes sure that the barrier member will reach the valve member and give it a forward propelling impulse only when the brake is actuated under conditions such as established normally for venting, especially by opening vent screws, in other words, under conditions at which the brake fluid volume flowing through the pressure regulator is much greater than the maximum volume flowing through the pressure regulator when the brake is actuated in operation.

BRIEF DESCRIPTION OF THE DRAWINGS

An embodiment of the invention will be explained in greater detail below with reference to a diagrammatic drawing. The drawing is an axial section of a pressure regulating valve in inoperative position.

DESCRIPTION OF THE PREFERRED EMBODIMENT

The pressure regulating valve shown has a substantially axially symmetrical, stepped cylindrical casing 10 for installation in a vehicle such that its axis A extends parallel to the longitudinal central plane of the vehicle and rises toward the front. The casing 10 has a rear bore portion 12 of greater diameter and a front bore portion 14 of smaller diameter and a front end wall 16. The casing is closed at the rear by a screwed-in plug 18.

The plug 18 is formed with an axially disposed inlet 20 by which the pressure regulating valve can be connected to a master cylinder of a vehicle braking system. The inlet 20 communicates through a passage 22 of smaller diameter with a cylindrical antechamber 24 likewise formed in the plug 18 and containing a barrier member 26. The barrier member 26 comprises an axial stem 28 projecting forwardly and rearwardly and a plurality of small bores 30 around the stem and is guided in the antechamber 24 with small radial clearance so as to be axially reciprocable.

The plug 18 serves to retain a stepped cylindrical insert 32 in the casing 10 and a partition 34 in the insert. The partition 34 is formed with a plurality of apertures one of which 36 is located in the center and has a somewhat greater diameter than the stem 28.

A valve chamber 40 is formed inside the insert 32 between paraxial ribs 38 and receives a spherical valve member 42. In forward direction the valve chamber 40 is limited by an annular conical step 44 followed by an axial cylindrical bore 46 in the front part of the insert 32. The diameter of the cylindrical bore 46 is smaller than the diameter of the front bore portion 14. Portions of a stepped piston 48 are guided in the cylindrical bore 46 and in the front bore portion 14, respectively. The smaller rear end surface of the stepped piston 48 limits the valve chamber 40, while the greater front end surface defines an outlet chamber 50 within the front bore portion 14.

An axial passage 52 forming a connection between the valve chamber 40 and the outlet chamber 50 extends through the stepped piston 48, the end of this passage facing the valve chamber 40 being surrounded by a valve seat 54. The valve seat 54 is formed at an elastomeric body 56 being retained by a sheet metal cap 58 on the rear end of the stepped piston 48.

The front end wall 16 of the casing 10 has an outlet 60 which is offset upwardly in parallel with the axis and by which the outlet chamber 50 communicates with a cylinder of one or more wheel brakes of a vehicle when the unit is installed. Generally these are the rear wheel brakes alone. The front wheel brakes are supplied directly with brake fluid from the master cylinder.

During service brake actuation, even if sudden, the amount of brake fluid entering through the inlet 20 is great enough in the extreme case, to move the barrier member 26 so far forwards that the front end of its stem 28 will enter slightly into the aperture 36 without reaching the valve member 42. However, if the volume of the brake fluid flowing in is extraordinarily great, the stem 28 will impact on the valve member 42 with a power corresponding to the vigorousness of the actuation of the brakes, thus moving the member in forward direction. A sufficient volume flow to accomplish that can be obtained by brake actuation once a vent has been opened which is located downstream of the pressure regulator. An even greater volume flow can be obtained in case of rupture of a conduit in a range of the braking system downstream of the pressure regulator or if a brake takes up an unusually great amount of brake fluid because of failure to adjust the brake. In such events it is desirable for the barrier member 26 to give the valve member 42 a sufficiently strong propelling impulse to close the valve entirely preliminarily. This will have the consequence that a greater porportion of the brake fluid made available by the master cylinder will reach brakes, especially front wheel brakes not connected downstream of the pressure regulator.

What is claimed is:

1. A pressure regulator for hydraulic vehicle braking systems, comprising a casing which has an inlet and a valve chamber connected to the same as well as an outlet, a valve seat which is arranged in the valve chamber at the entrance of a passage leading to the outlet, and a valve member which is arranged in the valve chamber so that brake fluid can flow around it and which is movable relative to the casing in response to deceleration of said casing from an inoperative position clear of said valve seat to a positiom against said valve seat, a partition defining an antechamber between the inlet and the valve chamber and having a central aperture, wherein a movable barrier member is disposed in the antechamber and includes a stem which is movable through the central aperture against the valve member, brake fluid being adapted to flow around or through said barrier member which is movable in response to the flow from an inoperative position remote from the valve member until its stem hits the valve member at least approximately in the direction of movement thereof.

2. The pressure regulator as claimed in claim 1, wherein a constricted axial passage is disposed between the inlet and the antechamber, the stem extending also in the direction of the inlet and projecting like a plug into the passage when the barrier member is in the inoperative position.

3. The pressure regulator as claimed in claims 1 or 2, wherein the travelling distance of the barrier member from its inoperative position until it hits the valve member under venting conditions is greater than its distance of travel under normal braking conditions.

* * * * *